(12) United States Patent
Doi et al.

(10) Patent No.: US 8,894,962 B2
(45) Date of Patent: Nov. 25, 2014

(54) CARBON MATERIAL AND METHOD OF MANUFACTURING THE SAME

(75) Inventors: Megumu Doi, Mitoyo (JP); Tsuyoshi Matsumoto, Mitoyo (JP); Yoshinari Miyamoto, Osaka (JP); Masao Tokita, Yokohama (JP)

(73) Assignee: Toyo Tanso Co., Ltd., Osaka-shi (JP)

( * ) Notice: Subject to any disclaimer, the term of this patent is extended or adjusted under 35 U.S.C. 154(b) by 0 days.

(21) Appl. No.: 13/501,569

(22) PCT Filed: Oct. 13, 2010

(86) PCT No.: PCT/JP2010/067966
§ 371 (c)(1),
(2), (4) Date: May 25, 2012

(87) PCT Pub. No.: WO2011/046146
PCT Pub. Date: Apr. 21, 2011

(65) Prior Publication Data
US 2012/0237437 A1    Sep. 20, 2012

(30) Foreign Application Priority Data

Oct. 13, 2009  (JP) ................................. 2009-235944

(51) Int. Cl.
*C01B 31/02*     (2006.01)
*C04B 35/52*     (2006.01)
*C04B 35/532*    (2006.01)
*C04B 35/645*    (2006.01)

(52) U.S. Cl.
CPC ....... *C04B 35/645* (2013.01); *C04B 2235/6562* (2013.01); *C04B 2235/96* (2013.01); *C04B 2235/77* (2013.01); *C04B 35/522* (2013.01); *C04B 35/532* (2013.01); *C01B 31/02* (2013.01); *C04B 2235/5436* (2013.01); *C04B 2235/9607* (2013.01); *C04B 2235/666* (2013.01); *C04B 2235/422* (2013.01)
USPC ...................................... 423/445 R; 423/460

(58) Field of Classification Search
CPC .. C04B 35/645; C04B 35/532; C04B 35/522; C04B 2235/6562; C04B 2235/666; C04B 2235/77; C04B 2235/777; C04B 2235/422; C04B 2235/96; C04B 2235/5432; C04B 2235/9602; C01B 31/02
USPC ...................................... 423/445 R, 448, 460
See application file for complete search history.

(56) References Cited

U.S. PATENT DOCUMENTS 4,089,934 A    5/1978   Akiyoshi et al.
4,226,900 A    10/1980  Carlson et al.
8,048,515 B2   11/2011  Nishiwaki et al.
2006/0202393 A1*  9/2006  Kortovich et al. ............ 264/449
2012/0014862 A1   1/2012  Nishiwaki et al.

FOREIGN PATENT DOCUMENTS

| EP | 2 474 515 A1 | 7/2012 |
| JP | 11-117006 A | 4/1999 |
| JP | 2000-007436 A | 1/2000 |
| JP | 2000007436 A * | 1/2000 |
| JP | 2003-292375 A | 10/2003 |
| JP | 2006-179140 A | 7/2006 |
| JP | 2008-535751 A | 9/2008 |
| JP | 2008-303108 A | 12/2008 |
| JP | 2011-051867 A | 3/2011 |

OTHER PUBLICATIONS

English Machine Translation of JPH11-17006.*
"Spark Plasma Sintering" Thermal Technology LLC <http://thermaltechnology.com/spark-plasma-sintering.html> 2012. Accessed Jul. 16, 2013.*
Wang, W. et al. "Mechanical properties and biological behavior of carbon nanotube/polycarbosilane composites for implant materials" Journal of Biomedical Materials Research Part B: Applied Biomaterials. vol. 82B, Issue 1, pp. 223-230, Jul. 2007.*
Uo, M., et al. "Multiwalled carbon nanotube monoliths prepared by spark plasma sintering (SPS) and their mechanical properties". Bio-Medical Materials and Engineering 19 (2009) 11-17.*
Hoshii, Shinsuke et al., "Preparation and Several Properties of Carbon Materials by Spark Plasma Sintering Method", Journal of the Material Science of Japan, 2003, pp. 47-51, vol. 40, w/ English abstract.
Hoshii, Shinsuke et al., "Rapid baking of graphite powders by the spark plasma sintering method", Letters to the editor/Carbon, 2000, pp. 1879-1902, vol. 38.
International Search Report of PCT/JP2010/067966, dated Nov. 16, 2010.
Extended European Search Report dated May 14, 2013, issued in corresponding European Patent Application No. 10823414.7 (8 pages).
Hoshii S et al., "Rapid baking of graphite powders by the spark plasma sintering method", Carbon, Elsevier, Oxford, GB; vol. 38, No. 13, Jan. 1 2000; pp. 1896-1899, XP004216392.
Chinese Office Action dated May 13, 2013, issued in corresponding Chinese patent application No. 201080045788.8, w/English translation.
Z. Shengmai et al., "Study of the Manufacture of Binderlers Carbon/Graphite Materials from Green Petroleun Coke", Journal of Hunan University, vol. 23, No. 3, pp. 71-75, Jun. 1996.

(Continued)

*Primary Examiner* — Richard M Rump
(74) *Attorney, Agent, or Firm* — Westerman, Hattori, Daniels & Adrian, LLP

(57) ABSTRACT

A carbon material and a method of manufacturing the carbon material are provided that can improve hardness and physical properties while fully gaining the benefit of SPS method, which makes it possible to obtain a dense carbon material with very short time. The carbon material is manufactured by a first step of filling mixture powder containing a carbon aggregate and a binder in a mold, and a second step of sintering the mixture powder by a spark plasma sintering method while compressing the mixture powder. The carbon material is characterized by having a Shore hardness HSD value of 60 or greater, and having a thermal expansion anisotropy ratio, an electrical resistivity anisotropy ratio, or a thermal conductivity anisotropy ratio, of 1.5 or greater.

4 Claims, No Drawings

(56) References Cited

OTHER PUBLICATIONS

Japanese Office Action dated Sep. 25, 2013, issued in corresponding Japanese Patent Application No. 2009-235944, w/English translation (5 pages).
European Office Action dated Feb. 27, 2014, issued in corresponding European Patent Application No. 10 823 414.7.
Chinese Decision of Rejection dated Jan. 27, 2014, issued in corresponding Chinese Patent Application No. 201080045788.8 with English Translation. (13 pages).
Japanese Office Action dated Jan. 8, 2014, issued in corresponding Japanese Patent Application No. 2009-235944 with English Translation. (6 pages).

* cited by examiner

CARBON MATERIAL AND METHOD OF MANUFACTURING THE SAME

TECHNICAL FIELD

The present invention relates to a carbon material and a method of manufacturing the carbon material. More particularly, the invention relates to a carbon material and a manufacturing method thereof that use SPS (spark plasma sintering).

BACKGROUND ART

Conventionally, carbon materials (graphite materials) with high density and high strength have been used for, for example, electrodes for electric discharge machining, components for semiconductor manufacturing equipment, components for ion implantation apparatus, continuous casting parts, heat sinks, and heat exchangers. Such a carbon material is produced as follows. A source material, coke, is subjected to primary crushing, and thereafter a binder is added thereto. Then, the mixture is knead and further subjected to secondary crushing, and a molded product is prepared by embossing or the like, followed by primary sintering (for example, at 900° C. for one month). Next, the primary sintered product is impregnated with pitch, and thereafter subjected to secondary sintering (for example, at 700° C. for about two weeks), and lastly, the resultant article is subjected to a graphitization process (for example, in an Acheson furnace at a temperature of 2800° C. or higher for about two month). Further, to prepare a carbon material having a bulk density of 2.0 Mg/m$^3$ or higher, it has been necessary to repeat, after the graphitization process, the pitch impregnating process, the secondary sintering process, and the graphitization process (see Patent Documents 1 to 3 below).

However, in the above-described manufacturing method of the carbon material, packing in packing powder is necessary to carry out the sintering process, and moreover, it is essential to conduct the pitch impregnating process in order to obtain a high density. Consequently, the manufacturing processes become complicated. Of the just-described ones of the manufacturing method of the carbon material, even the manufacturing method in which the graphitization process is carried out only one time (the method for manufacturing a carbon material having a bulk density of less than 2.0 Mg/m$^3$) takes a period of about 6 months to produce the carbon material, and the manufacturing method in which the graphitization process is carried out two times (the method for manufacturing a carbon material having a bulk density of 2.0 Mg/m$^3$ or greater) requires several more months. As a consequence, the production cost of the carbon material is high. An additional problem is as follows. The carbon material is used in combination with other materials such as metal. When the carbon material is joined to the metal or the like, stress is caused at the joined part since the just-described carbon material has a low thermal expansion rate, so peeling is apt to occur at the joined part. In particular, a carbon material with a high bulk density tends to have a low thermal expansion rate and therefore is susceptible to the just-mentioned problem. Still another problem with the conventional manufacturing method is that the controlling of the bulk density is difficult. Furthermore, the graphitization requires long hours of sintering at a high temperature of 2800° C. or higher, and therefore, energy consumption is great.

In addition, in order to control the physical properties of the carbon material to be within a desired range, it has been generally necessary that the amount of binder with respect to a carbon aggregate be controlled to 40 parts by weight or greater. However, since about 50% of the binder is volatilized in the sintering process, the sintering time becomes long, and moreover, it is necessary to provide a large treating furnace for conducting the incineration for the volatile components. Yet another problem is that a large amount of volatile components makes the sintering difficult, and it is difficult to make the carbon material into a specific shape.

In view of these problems, it has been proposed to use a method of using a material preparation technique called a spark plasma sintering method (hereinafter also referred to as "SPS method") using natural graphite powder as a source material. It has been reported that the use of this technique enables to obtain a dense carbon material with very short time. (See the following Non-Patent Documents 1 and 2.)

CITATION LIST

Patent Documents

[Patent Document 1] Japanese Unexamined Patent Publication No. 2000-007436
[Patent Document 2] Japanese Unexamined Patent Publication No. 2006-179140
[Patent Document 3] Japanese Unexamined Patent Publication No. 2008-303108

Non-Patent Documents

[Non-Patent Document 1] Journal of the Material Science of Japan, 40 (2003) 47-51.
[Non-Patent Document 2] Letters to the Editor/Carbon 38 (2000) 1879-1902.

SUMMARY OF THE INVENTION

Technical Problem

However, a problem with the SPS method using graphite powder alone as the starting material has been that the manufactured carbon material shows low physical properties, particularly low hardness.

Accordingly, it is an object of the present invention to provide a carbon material that offers high hardness and excellent physical properties while fully gaining the benefit of the SPS method, which makes it possible to obtain a dense carbon material with very short time, and to provide a method of manufacturing the carbon material.

Solution to Problem

In order to accomplish the foregoing object, the present invention provides a carbon material characterized by having a Shore hardness HSD value of 60 or greater and a thermal expansion anisotropy ratio of 1.5 or greater.

When the Shore hardness HSD value (hardness) is 60 or greater as in the above-described configuration, the carbon material can be used for many kinds of general purpose products. The reason why the Shore hardness HSD value is restricted in this way is that if the value is less than 60, the material becomes so brittle that it can be easily chipped when it is brought into contact with a sharp pointed object such as a needle.

In addition, when the carbon material is joined to another material, peeling occurs at the joined part if the thermal expansion rates (CTE) are greatly different between the carbon material and the other material. However, when the thermal expansion anisotropy ratio is 1.5 or greater as described above, the thermal expansion rate is closer to that of the other material in at least one direction, so it is possible to prevent large stress (a force that serves to peel the two materials in the joined surface) from occurring in that direction. As a result, in the joined surface, the carbon material is prevented from being peeled from the other material.

It should be noted that the material having such a high thermal expansion anisotropy ratio has not existed to date. For example, in commonly used isotropic carbon materials, the thermal expansion anisotropy ratio is from about 1.00 to about 1.05, and even in extruded carbon materials, the ratio is from about 1.2 to about 1.3. In addition, taking the above-described advantageous effects into consideration, it is particularly preferable that the thermal expansion anisotropy ratio be 2.0 or greater, more preferably 2.5 or greater. Moreover, in terms of hardness, it is further preferable that the Shore hardness HSD value be 70 or greater.

Here, in the present description, the term "thermal expansion anisotropy ratio" means the ratio of the thermal expansion rates that are dependent on the orientations of the material. As will be described later, the carbon material of the present invention is manufactured by a SPS method while compressing mixture powder containing a carbon aggregate and a binder. In this case, the thermal expansion anisotropy ratio is thermal expansion rate B/thermal expansion rate A, where the thermal expansion rate perpendicular to the pressing direction is defined as thermal expansion rate A and the thermal expansion rate parallel to the pressing direction is defined as thermal expansion rate B.

In the above-described configuration, it is desirable that the electrical resistivity anisotropy ratio be 1.5 or greater. It is also desirable that the thermal conductivity anisotropy ratio be 1.5 or greater.

The reasons will be described later.

In order to accomplish the foregoing object, the present invention also provides a carbon material characterized by having a Shore hardness HSD value of 60 or greater and an electrical resistivity anisotropy ratio of 1.5 or greater.

When the Shore hardness HSD value is 60 or greater as in the above-described configuration, the carbon material can be used for many kinds of general purpose products. In addition, when the electrical resistivity anisotropy ratio is 1.5 or greater, the material makes it possible to pass a higher current in one direction and at the same time to pass a lower current in a direction perpendicular to the one direction.

It should be noted that the material having such a high electrical resistivity anisotropy ratio has not existed to date. For example, in commonly used isotropic carbon materials, the electrical resistivity anisotropy ratio is from about 1.00 to about 1.05, and in extruded carbon materials, the ratio is from about 1.2 to about 1.3. In addition, taking the above-described advantageous effects into consideration, it is particularly preferable that the electrical resistivity anisotropy ratio be 1.7 or greater, more preferably 1.8 or greater. Moreover, in terms of hardness, it is further preferable that the Shore hardness HSD value be 70 or greater.

Here, in the present description, the term "electrical resistivity anisotropy ratio" means the ratio of the electrical resistivities that are dependent the orientations of the material. As will be described later, the carbon material of the present invention is manufactured by a SPS method while compressing mixture powder containing a carbon aggregate and a binder. In this case, the electrical resistivity anisotropy ratio is electrical resistivity D/electrical resistivity C, where the electrical resistivity perpendicular to the pressing direction is defined as thermal electrical resistivity C and the electrical resistivity parallel to the pressing direction is defined as electrical resistivity D.

In the above-described configuration, it is desirable that the thermal conductivity anisotropy ratio be 1.5 or greater.

The reasons will be described later.

In order to accomplish the foregoing object, the present invention also provides a carbon material characterized by having a Shore hardness HSD value of 60 or greater and a thermal conductivity anisotropy ratio of 1.5 or greater.

When the Shore hardness HSD value is 60 or greater as in the above-described configuration, the carbon material can be used for many kinds of general purpose products. In addition, when the thermal conductivity anisotropy ratio of 1.5 or greater, the following is possible. For example, when it is desired that the carbon material is used as a heat dissipating member and at the same time it is desired to inhibit heat conduction to the other region than the heat generating portion as a heat generating member, the heat dissipating member should be disposed in such a manner that the face thereof parallel to the face that is in contact with the heat generating member has a low thermal conductivity while it has a high thermal conductivity in a direction perpendicular to the face that is in contact with the heat generating member. This makes it possible to inhibit heat conduction to the region other than the heat generating portion. In other words, it is believed that when the carbon material is used in this way, heat conduction is mainly effected in a direction perpendicular to the face that is in contact with the heat generating member, so cooling efficiency also increases.

It should be noted that the material having such a high thermal conductivity anisotropy ratio has not existed to date. For example, in commonly used isotropic carbon materials, the thermal conductivity anisotropy ratio is from about 1.00 to about 1.05, and in extruded carbon materials, the ratio is from about 1.2 to about 1.3. In addition, taking the above-described advantageous effects into consideration, it is particularly preferable that the thermal conductivity anisotropy ratio be 1.7 or greater. Moreover, in terms of hardness, it is further preferable that the Shore hardness HSD value be 70 or greater.

Here, in the present description, the term "thermal conductivity anisotropy ratio" means the ratio of the thermal conductivities that are dependent on the orientations of the material. As will be described later, the carbon material of the present invention is manufactured by a SPS method while compressing mixture powder containing a carbon aggregate and a binder. In this case, the thermal conductivity anisotropy ratio is thermal conductivity E/thermal conductivity F, where the thermal conductivity perpendicular to the pressing direction is defined as thermal conductivity E and the thermal conductivity parallel to the pressing direction is defined as thermal conductivity F.

It is desirable that the thermal expansion rate along at least one direction be $10 \times 10^{-6}$/K or greater.

When the carbon material has a thermal expansion rate of $10 \times 10^{-6}$/K or greater, the thermal expansion rate is close to that of another material such as a metal, so it becomes possible to inhibit the peeling at the joined part when metal plating or coating is performed. For reference, the thermal expansion rates of representative metals are as follows; copper ($16.8 \times 10^{-6}$/K), gold ($14.3 \times 10^{-6}$/K), nickel ($12.3 \times 10^{-6}$/K), cobalt ($12.4 \times 10^{-6}$/K), stainless steel (10 to $17 \times 10^{-6}$/K), steel ($11 \times 10^{-6}$/K), and platinum ($9 \times 10^{-6}$/K). Thus, it is appreciated that they are close to the thermal expansion rate of the carbon material. Accordingly, when the carbon material is joined to these metals or when the surface of the carbon material is covered with these metals, thermal stress can be controlled from occurring. Note that the thermal expansion rate of commonly used carbon material is about $5\times10^{-6}$/K, which is lower than that of the carbon material of the present invention.

As for the thermal expansion rate of the carbon material, the thermal expansion rate along a direction parallel to the pressing direction may be $10\times10^{-6}$/K or greater when the carbon material is manufactured by the SPS method. When the carbon material is manufactured by the SPS method, the thermal expansion rate cannot be controlled to a desired value without addition of a binder.

Here, it is desirable that the carbon material have a bulk density of 1.8 Mg/m$^3$ or greater, more desirably 1.9 Mg/m$^3$ or greater. It is desirable that the carbon material have an average pore radius of 0.5 μm or less, more desirably 0.25 μm or less. Moreover, it is desirable that the carbon material have a flexural strength of 20 MPa or greater, more desirably 30 MPa or greater. In addition, it is desirable that the carbon material have a compressive strength of 80 MPa or greater.

In order to accomplish the foregoing object, the present invention also provides a method of manufacturing a carbon material, characterized by comprising: a first step of filling mixture powder containing a carbon aggregate and a binder in a mold; and a second step of sintering the mixture powder by a spark plasma sintering method while compressing the mixture powder.

The above-described method eliminates the need for the molding step, as well as the primary sintering step, the graphitization step, and the like (in other words, a high performance carbon material can be produced with a smaller number of steps). Therefore, the productivity can be improved, and the carbon material can be produced with less energy. As a result, the production costs of the carbon material can be reduced. Furthermore, the manufacturing period, which has conventionally been several months, is shortened to several ten minutes according to this method. Therefore, an innovative improvement in the productivity is possible in this respect as well.

In addition, the method makes it possible to adjust the bulk density, anisotropy ratio, denseness, thermal expansion rate, and the like of the material by adjusting the pressure, temperature, and duration in the sintering. Therefore, a carbon material having desired conditions can be easily manufactured.

Furthermore, with the conventionally used isotropic material, it is difficult to control the average pore radius to 0.5 μm or less even if pores are filled by a pitch impregnating process. On the other hand, the above-described method can produce a carbon material having an average pore radius of 0.5 μm or less without necessitating the process step such as the pitch impregnating process. Thus, a dense carbon material can be easily manufactured.

The reason why the binder is added in the first step is as follows. If no binder is added, the Shore hardness HSD value (hardness) becomes less than 60, the material becomes so brittle that it can be easily chipped when it is brought into contact with a sharp pointed object such as a needle. On the other hand, when a binder is added, the Shore hardness HSD value becomes 60 or greater, making it possible to avoid the just-mentioned problem. In other words, the binder is added for the purpose of strengthening the binding in the carbon aggregate (between carbon particles).

It is desirable that the temperature be 2500° C. or lower in the sintering by the spark plasma sintering method. It is more preferable that the temperature be 2000° C. or lower.

The reason is as follows. Even when the process is conducted at 2000° C., the same or better characteristics, such as bulk density, can be obtained as those obtained with the graphitization at 2800° C. or higher in conventional techniques. Therefore, the advantage that the carbon material can be produced with less energy can be fully exhibited.

It is preferable that the proportion of the binder with respect to the carbon aggregate (hereinafter also simply referred to as the proportion of the binder) be from 3 parts by weight to less than 60 parts by weight, more preferably from 10 parts by weight to 30 parts by weight. The reason is as follows. If the amount of the binder is less than 3 parts by weight, the advantageous effects obtained by adding the binder cannot be obtained sufficiently. On the other hand, if the amount of the binder is 60 parts by weight or greater, the flowability resulting from the melting of the binder becomes high in the SPS process, so the molding becomes difficult.

Furthermore, generally, binders are produced in smaller quantity and therefore more costly than carbon aggregate. Therefore, by particularly restricting the proportion of the binder to 30 parts by weight, it is possible to achieve savings in natural resources and reduction in the production costs of the carbon material. If the proportion of the binder exceeds 30 parts by weight, the characteristics of the binder may have greater influence on the carbon material. On the other hand, if the proportion of the binder is 30 parts by weight or less, the characteristics of the binder are insignificant, so it is possible to provide substantially the same characteristics to the carbon material irrespective of the amount of the binder. Moreover, since the proportion of the binder is small, it is unnecessary to provide a furnace for conducting incineration for volatile components. Thus, the size of the manufacturing apparatus can be reduced.

It is desirable that the mold be made of graphite.

When the mold is made of graphite, the processing of the mold is easy because graphite is soft. Moreover, since the mold can be easily made into a specific shape, it is possible to manufacture a carbon material having a shape close to the desired shape (in other words, near net shape is possible), so the amount of subsequent machining process can be reduced in the subsequent processes. As a result, the production costs and savings in resources can be achieved.

It is desirable that the carbon material of the invention be a carbon material manufactured by filling mixture powder containing a carbon aggregate and a binder in a mold, and thereafter sintering the mixture powder by a spark plasma sintering method while compressing the mixture powder, the carbon material having a bulk density of 1.9 Mg/m$^3$ or greater.

With the just-described carbon material, it is possible to manufacture a high density carbon material without necessitating complicated manufacturing processes.

Advantageous Effects of the Invention

The present invention exhibits the significant advantageous effects of making it possible to obtain a carbon material that is dense and has high strength within very short time while preventing complication of manufacturing process, increase in energy consumption, and increase in manufacturing costs.

DESCRIPTION OF EMBODIMENTS

Hereinbelow, embodiments of the present invention will be described.

First, a mixture (particle size 100 μm or less, and theoretical density 2.3 g/cm$^3$) of 20 parts by weight of coal-tar pitch and 100 parts by weight of petroleum coke having been crushed (primary crushing) was kneaded at 150° C. to 250° C. to adjust volatile components, and the kneaded material was crushed again (secondary crushing) into an average particle size of 40 μm. Next, the re-crushed mixture was loaded into a graphite SPS die (outer diameter 50.6 mm, inner diameter 20.4 mm, height 60 mm) of a spark plasma sintering apparatus (SPS-3.205 made by Sumitomo Coal Mining Co., Ltd.). The mixture in the graphite SPS die can be pressurized by two graphite SPS sintering punches (each having a diameter of 20.0 mm and a thickness of 25 mm). In addition, when the mixture is loaded in the graphite SPS die, carbon paper is disposed between the sintered substance and the graphite SPS die and between the sintered substance and the graphite SPS sintering punches, in order to ensure good mold release capability of the sintered substance from the graphite SPS die and the graphite SPS sintering punches after sintering the mixture. Next, the pressure of the interior of the spark plasma sintering apparatus was reduced to about 3 Pa, and thereafter, the temperature of the interior of the spark plasma sintering apparatus was elevated to 2000° C. at a rate of about 100° C./min. In this process, argon gas was introduced in the spark plasma sintering apparatus at the time when the interior of the spark plasma sintering apparatus was elevated to 1800° C. Thereafter, electric current was passed for 20 minutes while compressing the mixture at a pressure of 40 MPa, whereby a carbon material comprising graphite was obtained.

The conditions of the spark plasma sintering are not particularly limited. It may be conducted with a pressing force of from 1 MPa to 100 MPa, a temperature of from 100° C. to 2500° C., and a duration of from 5 minutes to 24 hours. Also, by varying these conditions, it is possible to adjust the properties such as the thermal expansion rate, the electrical resistance value, and the thermal conductivity to desired values to a certain degree.

The carbon powder (carbon aggregate), the source material, is not particularly limited, and various materials may be used, such as mosaic coke and needle coke. The average particle size of this carbon aggregate in primary crushing may be from 1 μm to 1000 μm. With the SPS method, the characteristics of such powder can be exploited for the carbon material. Therefore, selection of the carbon powder should be made so that it matches the required characteristics. For example, if the material is desired to have high thermal expansion rate and high thermal conductivity but low electrical resistivity, it is preferable to use needle coke. Furthermore, the type of carbon powder is not limited to one, but various types of carbon powders may be used in combination. When carbon powders with different characteristics are mixed, it is easy to obtain required characteristics.

Furthermore, the type of binder is not particularly limited, and synthetic resins and petroleum pitch may be used other than the coal-tar pitch. The average particle size in the secondary crushing may be from 1 μm to 1000 μm.

EXAMPLES

Example 1

A carbon material prepared in the manner described in the just-described embodiment was used for Example 1.

The carbon material fabricated in this manner is hereinafter referred to as a present invention material A1.

Example 2

A carbon material was fabricated in the same manner as described in Example 1 above, except that the proportion of the coal-tar pitch was set at 5 parts by weight.

The carbon material fabricated in this manner is hereinafter referred to as a present invention material A2.

Comparative Example

A carbon material was fabricated in the same manner as described in Example 1 above, except that no coal-tar pitch was added.

The carbon material fabricated in this manner is hereinafter referred to as a comparative material Z.

Experiment

For the present invention materials A1 and A2 as well as the comparative material Z, the thermal expansion anisotropy ratio, thermal conductivity anisotropy ratio, hardness, electrical resistivity anisotropy ratio, flexural strength, compressive strength, average pore radius, and bulk density were determined. The results are shown in Table 1 and 2 below. The methods of the measurements were as follows.

(1) Measurement of Thermal Conductivity

Using the samples each processed to have a diameter of 10 mm and a thickness of 3 mm, the thermal diffusivity was determined using a laser flash thermal constant analyzer TC-9000 (made by ULVAC, Inc.), and the thermal conductivity at room temperature was calculated from the heat capacity and the bulk density.

(2) Measurement of Average Pore Radius

Using a mercury porosimeter made by Micromeritics Inc., the average pore radius was obtained from the mercury intrusion pressure, according to the Washburn equation. The Washburn equation is represented as r=−2δ cos θ/P [r: pore radius, δ: mercury's surface tension (480 dyne/cm), θ: contact angle (141.3° was employed in the present experiment), and P: pressure].

(3) Measurement of Thermal Expansion Rate

Using samples each processed into dimensions of 5×5×20 (mm), the temperature of each sample was elevated under a $N_2$ atmosphere at a rate of 10° C. per minute, and the value obtained at 1000° C. was measured using a thermo-mechanical analyzer TMA8310 (made by Rigaku Corp.).

(4) Measurement of Shore Hardness HSD Value (Hardness)

The Shore hardness HSD value was measured at room temperature using a Shore hardness tester D-type.

(5) Measurement of Flexural Strength

The flexural strength was measured at room temperature using an Instron-type material testing machine.

(6) Measurement of Compressive Strength

The compressive strength was measured at room temperature using a Tensilon universal testing machine.

TABLE 1

| | Proportion of coal-tar pitch | Sintering condition | | Thermal expansion rate | | | Thermal conductivity | | | |
|---|---|---|---|---|---|---|---|---|---|---|
| | | | | Thermal expansion rate B parallel to pressing | Thermal expansion rate A perpendicular to pressing | Anisotropy | Thermal conductivity F parallel to pressing | Thermal conductivity E perpendicular to pressing | Anisotropy | |
| Carbon material | (parts by weight) | Temperature (C.°) | Time (min.) | direction (/K) | direction (/K) | ratio (B/A) | direction (W/(m · K)) | direction (W/(m · K)) | ratio (E/F) | Hardness (HSD) |
| A1 | 20 | 2000 | 20 | $14.1 \times 10^{-6}$ | $5.2 \times 10^{-6}$ | 2.70 | 36 | 64 | 1.56 | 96 |
| A2 | 5 | | | $14.0 \times 10^{-6}$ | $5.1 \times 10^{-6}$ | 2.75 | 21 | 36 | 1.71 | 75 |
| Z | 0 | | | $14.1 \times 10^{-6}$ | $4.7 \times 10^{-6}$ | 2.98 | 18 | 37 | 2.06 | 56 |

TABLE 2

| | Proportion of coal-tar pitch | Sintering condition | | Electrical resistivity | | | | | | |
|---|---|---|---|---|---|---|---|---|---|---|
| | | | | Electrical resistivity D parallel to pressing | Electrical resistivity C perpendicular to pressing | Anisotropy | Flexural strength | Compressive strength | Average pore radius | Bulk density |
| Carbon material | (parts by (weight) | Temperature (C.°) | Time (min.) | direction (μΩm) | direction (μΩm) | ratio (D/C) | (MPa) | (MPa) | (μm) | (Mg/m³) |
| A1 | 20 | 2000 | 20 | 41.1 | 22.5 | 1.83 | 53 | 176 | 0.19 | 1.93 |
| A2 | 5 | | | 65.3 | 28.6 | 1.87 | 24 | 83 | 0.08 | 1.87 |
| Z | 0 | | | 69.7 | 34.8 | 1.92 | 19 | 65 | 0.08 | 1.88 |

[Thermal Expansion Anisotropy Ratio]

As clearly seen from Table 1, the present invention materials A1 and A2 have the thermal expansion anisotropy ratios of 2.70 and 2.75, respectively, and it confirms that they have anisotropy in thermal expansion rate. Although they show slightly less thermal expansion anisotropy ratios than the comparative material Z, they have a thermal expansion anisotropy ratio of 1.50 or greater, which is considered practically usable level.

[Thermal Conductivity Anisotropy Ratio]

As clearly seen from Table 1, the present invention materials A1 and A2 have thermal conductivity anisotropy ratios of 1.56 and 1.71, respectively, and it confirms that they have anisotropy in thermal conductivity. Although they show slightly less thermal conductivity anisotropy ratios than the comparative material Z, they have a thermal conductivity anisotropy ratio of 1.50 or greater, which is considered a practically usable level.

[Electrical Resistivity Anisotropy Ratio]

As clearly seen from Table 2, the present invention materials A1 and A2 have electrical resistivity anisotropy ratios of 1.83 and 1.87, respectively, and it confirms that they have anisotropy in electrical resistivity. Although they show slightly less electrical resistivity anisotropy ratios than the comparative material Z, they have an electrical resistivity anisotropy ratio of 1.50 or greater, which is considered a practically usable level.

[Hardness]

As clearly seen from Table 1, the present invention materials A1 and A2 have Shore hardness HSD values (hardness) of 96 and 75, respectively. This means that both of them have a Shore hardness HSD value of 60 or greater, which is considered a practically usable level, and the materials cannot be easily chipped when they are brought into contact with a sharp pointed object such as a needle. On the other hand, the comparative material Z has a Shore hardness HSD value of 56. This confirms that the material is so brittle that it can be easily chipped when it is brought into contact with a sharp pointed object such as a needle, and it is below the practically usable level.

[Conclusion from the Foregoing]

From the above discussion, the present invention materials can ensure the practically usable levels of thermal expansion anisotropy, thermal conductivity anisotropy, and electrical resistivity anisotropy, while ensuring the practically usable level of hardness.

[Flexural Strength]

As clearly seen from Table 2, the present invention materials A1 and A2 have flexural strengths of 53 MPa and 24 MPa, respectively, which are above the practically usable level, 20 MPa or greater. On the other hand, the comparative material Z has a flexural strength of 19 MPa, which is below the practically usable level.

[Compressive Strength]

As clearly seen from Table 2, the present invention materials A1 and A2 have compressive strengths of 176 MPa and 83 MPa, respectively, which are above the practically usable level, 80 MPa or greater. On the other hand, the comparative material Z has a compressive strength of 65 MPa, which is below the practically usable level.

[Average Pore Radius]

As clearly seen from Table 2, the present invention materials A1 and A2 have average pore radii of 0.19 μm and 0.08 μm, respectively. On the other hand, the comparative material Z has an average pore radius of 0.08 μm. Although the present invention material A1 has a greater average pore radius than the comparative material Z, it is below 0.50 μm, which is considered a practically usable level.

[Bulk Density]

As clearly seen from Table 2, the present invention materials A1 and A2 have bulk densities of 1.93 Mg/m³ and 1.87 Mg/m³, respectively, which are above the practically usable level, 1.8 Mg/m³ or greater. The comparative material Z has a bulk density of 1.88 Mg/m³, and therefore, as far as this point is concerned, it is above the practically usable level.

It should be noted that the spark plasma sintering method in the present specification means the same technique as or a similar technique to, for example, pulse current pressure sintering, spark sintering, plasma activated sintering, pulsed high current process, and pulse current sintering, and it means to include these techniques.

Industrial Applicability

The present invention is applicable to, for example, electrodes for electric discharge machining, components for semiconductor manufacturing equipment, components for ion implantation apparatus, continuous casting parts, heat sinks, and heat exchangers.

The invention claimed is:

1. A method of manufacturing a carbon material, characterized by comprising:
   a first step of kneading a carbon aggregate and a binder which comprises at least one selected from the group consisting of coal-tar pitch, synthetic resins and petroleum pitch while heating the carbon aggregate and the binder to prepare a mixture;
   a second step of crushing the mixture to prepare a mixture powder;
   a third step of filling the mixture powder in a mold; and
   a fourth step of sintering the mixture powder by a spark plasma sintering method while compressing the mixture powder in the mold, wherein
   the amount of the binder with respect to the carbon aggregate is 5 to 20 parts by weight.

2. The method of manufacturing a carbon material according to claim 1, wherein the sintering temperature in the fourth step is 2500° C. or lower.

3. The method of manufacturing a carbon material according to claim 1, wherein the mold is made of graphite.

4. The method of manufacturing a carbon material according to claim 1, wherein the carbon material is prepared so as to have a Shore hardness HSD value of 60or greater.

\* \* \* \* \*